Figure 2:
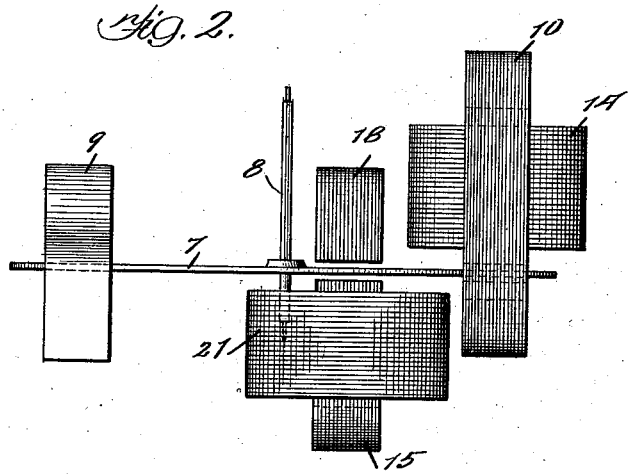

R. C. LANPHIER.
INDUCTION METER.
APPLICATION FILED NOV. 9, 1910.

1,010,271.

Patented Nov. 28, 1911.

2 SHEETS—SHEET 1.

Witnesses

Inventor:
Robert C. Lanphier
By Bond Adams Pickard Jackson
Attys

COLUMBIA PLANOGRAPH CO., WASHINGTON, D. C.

R. C. LANPHIER.
INDUCTION METER.
APPLICATION FILED NOV. 9, 1910.

1,010,271.

Patented Nov. 28, 1911.

2 SHEETS—SHEET 2.

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

INDUCTION-METER.

1,010,271.  Specification of Letters Patent.  Patented Nov. 28, 1911.

Application filed November 9, 1910. Serial No. 591,459.

*To all whom it may concern:*

Be it known that I, ROBERT C. LANPHIER, a citizen of the United States, residing at Springfield, in the county of Sangamon and State of Illinois, have invented certain new and useful Improvements in Induction-Meters, of which the following is a specification, reference being had to the accompanying drawings.

My invention relates to induction meters for alternating currents, and particularly to the well-known split-phase type of induction meters having series and shunt fields of different phase acting on a rotatable metallic conductor which is also provided with permanent magnets acting upon the conductor in order to damp or brake the rotation; and it is the object of my invention to provide a new and improved arrangement of the series and shunt fields with relation to the rotatable disk. It is well known that with fields of given strength and given phase-relation to each other and with a given conductivity of the armature a maximum turning effect or torque will be obtained when the fields are at a maximum distance from the center of rotation of the armature—that is to say, act upon the rotatable armature at a maximum radius. Inasmuch as the rotation of the armature is produced in this type of meters by the interaction upon one another of fields of different phase relations, and as the interaction of these fields depends upon eddy currents induced in the armature which have their maximum strength near the point where they are created, it is also advisable that the fields of different phase should be located as near to each other as the possibilities of the structure, and particularly the size of the coils on the field poles, will permit. In meters of this type—that is to say, in which the rotatable disk or armature is braked by the permanent magnets acting upon the armature itself—it frequently happens that a sudden flux produced at the gaps of the series magnet by short circuiting or by a sudden overload on the line to which the meter is connected will, unless some means is taken to prevent, react upon the permanent magnets in such a way as to wholly or in part deprive them of their magnetism and thereby, of course, affect their braking power.

It is therefore another object of my invention to provide a structural arrangement by which any such sudden flux at the gaps of the series laminated magnet will be absorbed by the structure of the shunt magnet and thereby prevent their affecting the permanent magnets, without the necessity for providing a special shield to accomplish this end,—my structure being such as to inherently, and without the use of any such shield, prevent the demagnetization of the permanent magnets by such sudden flux. To that end, therefore, I have provided a structure in which the poles of the series and of the shunt fields are located at a maximum radius on the disk—that is to say, near and each equally near the periphery of the disk. One set of poles is located quite a distance apart, the laminated pole pieces being located near the center line of the disk, while the other pair of pole pieces are located close together on radial lines which lie between the other two pole pieces and as close to the pole pieces of the other pair as the windings on the respective pole pieces will permit. By these features of the structure I provide a construction in which the fields will act upon the armature at a maximum radius and in which the fields of different phase will lie close to one another so that their interaction with the eddy currents may take place near where the eddy currents are formed. The shielding of the permanent magnets is accomplished by connecting the outer pair of magnets, which lie close together, in series with the load circuit and by connecting the inner pair in shunt with the circuit, so that the laminated structure upon which the shunt coils are placed lies between the series field and the permanent magnet.

I attain the objects of my invention as illustrated in the drawings and as hereinafter described. What I regard as new is set forth in the claims.

Figure 1:
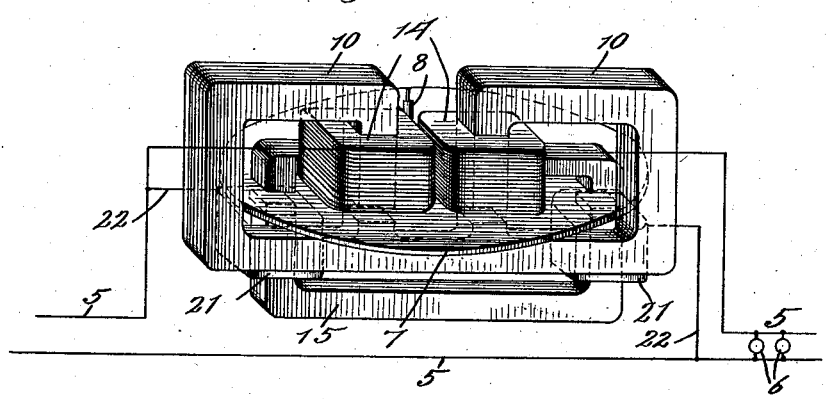
Figure 3:
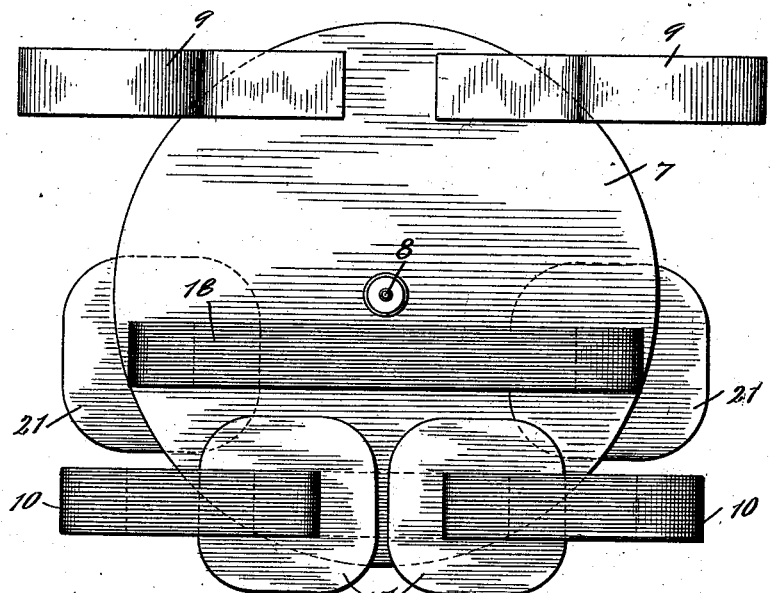
Figure 4:
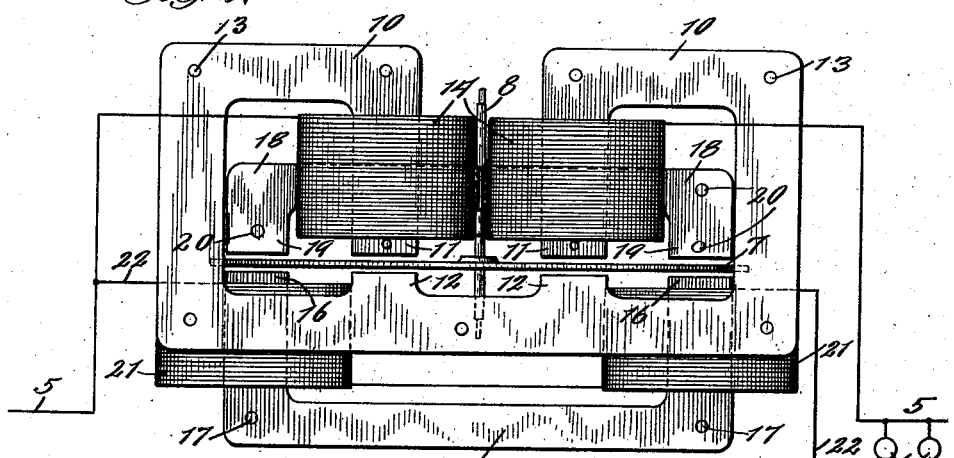

In the drawings,—Figure 1 is a perspective view of the essential features of my device, the casing, the time train and shaft which drives the same, and other well-known features of the invention being omitted in order to prevent confusion of illustration; Fig. 2 is an enlarged end view of the parts shown in Fig. 1, seen from the left in Fig. 1; Fig. 3 is an enlarged top or plan view of the same parts; and Fig. 4 is an enlarged front elevation of the same.

Referring to the drawings,—5 indicates the load circuit with translating devices 6.

7 indicates a disk, preferably of copper or aluminum, which is mounted upon a spindle 8 journaled in suitable bearings in any suitable way (not shown) as the same constitute no part of my present invention.

9 indicates permanent damping magnets, which are located to the rear of the structure in the form shown, and which act in the well-known manner to brake or damp the disk 7.

10 indicates electromagnets, which are formed of a series of laminated plates cut or stamped in the shape best shown in Fig. 4 and suitably fastened together. They are provided with pole-pieces 11 and 12, which are opposed to each other and embrace the disk 7 and lie close enough together to just permit the free rotation of the disk between them. Each of the plates of which this laminated magnet is composed is stamped from a single thin plate of metal so that by bending the downward projecting arms which form the pole-pieces 11 to one side they may be threaded through the energizing coils hereinafter described and then suitably fastened together, as by rivets 13, thereby preventing leakage or variation in air gaps which are likely to occur in magnets built up in pieces which leave joints or openings in the magnetic circuit.

14 indicates energizing coils, which, in the embodiment of my invention shown in the drawings, consist of relatively few turns of coarse wire and are connected in series with the main circuit, as is best shown in Figs. 1 and 4. As will be best seen from Fig. 3, the magnetic fields formed by the pole-pieces 11 and 12 lie close to the periphery of the disk and act at a maximum radius on said disk.

15 indicates an electromagnet formed of a series of laminated plates, each stamped in a widened U-shape substantially as shown in Fig. 4, and having pole-pieces 16. The laminated plates are suitably fastened together, as by rivets 17. The electromagnet 15 is located between the electromagnet 10 and the center of the disk, and as is best shown in Figs. 3 and 4 the magnet is of such length across the disk that the pole-pieces are located close to the periphery of the disk.

18 indicates a return-plate having pole-pieces 19, and, like the electromagnet 15, formed of laminated iron plates held together by suitable rivets, as 20. The return-plate 18, as is best shown in Fig. 3, is located immediately above the electromagnet 15 so that the disk is embraced between the pole-pieces 16 of the magnet and pole-pieces 19 of the return-plate, the said pole-pieces lying close enough together to just permit the free rotation of the disk between them.

21 indicates energizing coils mounted on the pole-pieces 16 of the magnet 15 and, in the form in which my invention is embodied in the drawings, composed of a large number of turns of very fine wire connected in shunt relation, as by connecting wires 22, with the main circuit. The series fields and the shunt fields above described, it will be readily seen, are each located so as to act upon the periphery of the disk—that is to say, at a maximum distance from its center—and the interacting poles of the series and shunt fields are placed as close to one another as the size of the coils thereon will permit, thus obtaining a maximum interaction by reason of the difference of phase between the respective fields and a maximum torque by reason of their acting at a maximum radius on the armature.

The necessary difference in phase between the shunt and the series fields may be obtained in any well-known manner. In the form in which my invention is shown and embodied in the drawings herein, this difference in phase is produced by having the series field energized by a few turns of heavy wire and the shunt field energized by a great number of turns of very fine wire. The rotation of the disk is produced in the well-known and understood manner by interaction of the fields of different phase upon the eddy currents induced in the disk, and it is not necessary to describe the same fully here, as it will be readily understood. It is to be noted, however, that in the arrangement shown the series fields are simultaneously of the same polarity, while the two shunt fields are at any given instant of opposite polarity, thus, upon well-known principles, causing each pair of fields of different phase to produce at any moment a torque in the same direction. So far as the mere causing of the rotation of the disk is concerned, it is obvious that instead of having the outer fields connected in series with the load circuit and the inner fields in shunt or derived relation therewith, the same effect will be produced by reversing the arrangement and having the inner fields energized by a few turns of coarse wire connected in series with the load circuit and the outer fields energized by a large number of turns of fine wire connected in shunt or derived relation with the main load circuit, and therefore the effect upon the rotation of the disk produced by my arrangement of the two pairs of fields, in which all of the fields are located close to the periphery of the disk and the interacting poles of each field placed close to each other, would be the same as with the arrangement above described. This arrangement, however, would not contain the other advantage of the structure above shown and described—namely, that of preventing the demagnetization of the permanent magnet by any sudden flux between the pole-pieces in series with the load circuit. By placing the poles as above described—that is to say, with the series fields upon the outside and with the structure which forms the shunt fields between them and the permanent magnets—any sudden change in flux of the magnetism of the series fields will be absorbed by the laminated structure of the shunt magnet and thereby demagnetization of the permanent magnets by such sudden flux will be prevented.

It will, of course, be understood that the structure will in use be provided with the usual casing in which the parts above described are suitably mounted; that it will be provided with the usual time-train and indicating dials driven suitably from the armature shaft, with suitable light load adjusting devices and suitable arrangements for phase compensation of the shunt field; but as such devices are well known in the art and will be readily understood by one skilled therein, and as they of themselves form no part of my present invention, I have not shown any such parts in the drawings in order that the same may not be encumbered with useless illustration, and have shown only the important features of my invention.

That which I claim as my invention, and desire to secure by Letters Patent, is,—

1. In an alternating-current motor-meter, in combination, a revoluble disk armature, a pair of energizing magnet poles adapted to act on said disk and located respectively at the ends of relatively widely separated radial lines of said disk, a second pair of energizing magnet poles adapted to act on said disk and located respectively near the ends of radial lines thereof relatively closer together, and means for producing difference in phase between said first-named pair of energizing magnet poles and said second pair of energizing magnet poles.

2. In an alternating-current motor-meter, in combination, a revoluble disk armature, permanent magnets adapted to brake said disks, an energizing magnet connected in series with the main load circuits and having a pair of air gaps within which said disk revolves and located near the ends of radial lines of said disk relatively close together, a second energizing magnet having a portion of its body between said series magnet poles and said permanent magnets and having two pairs of air gaps within which said disk revolves and located near the ends of relatively widely separated radii thereof and adapted to be connected in shunt relation to the main load circuit.

3. In an alternating-current electric motor-meter, in combination, a revoluble disk, permanent braking magnets adapted to retard the rotation of said disk, an energizing magnet having two air gaps embracing said disk and located near the end of radii thereof relatively close together and having energizing windings consisting of relatively few turns of relatively large wire and adapted to be connected in series with the main load circuit so as to produce in said air gaps energizing fields of like polarity at any given instant, a second energizing magnet having a pair of poles located at one side of said disk between said first-named electromagnet and said permanent magnets and having said pole-pieces located near the ends of relatively widely separated radii of said disk, a return piece located on the other side of said disk between said first-named energizing magnet and said permanent magnets and having pole-pieces adapted to be registered with the pole-pieces of said second energizing magnet, having coils consisting of a relatively large number of turns of relatively small wire adapted to be connected in shunt relation to said main load circuit, and to produce in gaps between the pole-pieces of said magnet and the pole-pieces of said return piece at any given instant magnetic fields of opposite polarity.

ROBERT C. LANPHIER.

Witnesses:
GRACE L. HOOPER,
CHAS. G. LANPHIER.

---

Copies of this patent may be obtained for five cents each, by addressing the "Commissioner of Patents, Washington, D. C."